US009208315B2

(12) United States Patent
Hussain et al.

(10) Patent No.: US 9,208,315 B2
(45) Date of Patent: Dec. 8, 2015

(54) IDENTIFICATION OF TELEMETRY DATA (75) Inventors: Ahmed S. Hussain, Seattle, WA (US); Ajith Kumar, Bellevue, WA (US); Catalin D. Sandu, Kirkland, WA (US); Alvin Loh, Kirkland, WA (US); Sterling M. Reasor, Bellevue, WA (US); Santanu Chakraborty, Bellevue, WA (US); Joseph L. Faulhaber, Bozeman, MT (US)

(73) Assignee: Microsoft Corporation, Redmond, WA (US)

( * ) Notice: Subject to any disclaimer, the term of this patent is extended or adjusted under 35 U.S.C. 154(b) by 1169 days.

(21) Appl. No.: 12/405,252

(22) Filed: Mar. 17, 2009

(65) Prior Publication Data
US 2010/0242094 A1  Sep. 23, 2010

(51) Int. Cl.
  *G06F 11/00* (2006.01)
  *G06F 21/56* (2013.01)
(52) U.S. Cl.
  CPC .................. *G06F 21/564* (2013.01)
(58) Field of Classification Search
  CPC ..... G06F 21/56; G06F 21/561; G06F 21/564; H04L 63/145
  USPC ................. 726/4, 22, 24
  See application file for complete search history.

(56) References Cited

U.S. PATENT DOCUMENTS

| | | | |
|---|---|---|---|
| 6,269,080 B1 * | 7/2001 | Kumar ........................ | 370/236 |
| 6,768,994 B1 | 7/2004 | Howard et al. | |
| 7,480,683 B2 * | 1/2009 | Thomas et al. ................. | 1/1 |
| 7,496,960 B1 * | 2/2009 | Chen et al. ..................... | 726/22 |
| 7,774,845 B2 * | 8/2010 | Shipman ........................ | 726/23 |
| 7,805,606 B2 * | 9/2010 | Birger et al. .................. | 713/168 |
| 7,809,685 B2 * | 10/2010 | Wolff ............................ | 707/648 |
| 8,438,637 B1 * | 5/2013 | Gryaznov ...................... | 726/22 |
| 2003/0079145 A1 * | 4/2003 | Kouznetsov et al. ......... | 713/200 |
| 2004/0068505 A1 * | 4/2004 | Lee et al. ...................... | 707/100 |
| 2005/0154557 A1 | 7/2005 | Ebert | |
| 2006/0161988 A1 * | 7/2006 | Costea et al. .................. | 726/25 |
| 2006/0230456 A1 * | 10/2006 | Nagabhushan et al. ....... | 726/25 |
| 2007/0038677 A1 | 2/2007 | Reasor et al. | |
| 2007/0121509 A1 | 5/2007 | Taylor et al. | |
| 2007/0180529 A1 | 8/2007 | Costea et al. | |
| 2007/0204341 A1 * | 8/2007 | Rand et al. .................... | 726/22 |
| 2007/0240217 A1 * | 10/2007 | Tuvell et al. .................. | 726/24 |
| 2008/0034434 A1 | 2/2008 | Repasi et al. | |
| 2008/0120722 A1 * | 5/2008 | Sima et al. ..................... | 726/25 |
| 2008/0141371 A1 * | 6/2008 | Bradicich et al. .............. | 726/23 |
| 2009/0235357 A1 * | 9/2009 | Ebringer et al. ............... | 726/24 |

(Continued)

OTHER PUBLICATIONS

Bureau et al., "Optimising Networks Against Malware," Performance, Computing, and Communications Conference, 2007. IPCCC 2007. IEEE International, pp. 518-527.*

(Continued)

*Primary Examiner* — Roderick Tolentino
(74) *Attorney, Agent, or Firm* — Ben Tabor; Sandy Swain; Micky Minhas (57) ABSTRACT

Methods, systems, and computer-readable media are disclosed for identifying telemetry data. A particular method scans a file and compares the file to at least one attribute to be used for telemetry collection. When the file is identified as a telemetry candidate, an offer to submit a sample of the file is sent to a server. A response to the offer is received from the server. If the response to the offer indicates an acceptance, a sample of the file is sent to the server.

20 Claims, 7 Drawing Sheets

(56) References Cited

U.S. PATENT DOCUMENTS

2009/0293125 A1* 11/2009 Szor ............................... 726/24
2009/0320133 A1* 12/2009 Viljoen et al. .................. 726/24

OTHER PUBLICATIONS

Zhang et al., "Unknown Malicious Codes Detection Based on Rough Set Theory and Support Vector Machine," Neural Networks, 2006. IJCNN '06. International Joint Conference, pp. 2583-2587.*

Deb, et al."Remote Diagnosis of the International Space Station utilizing Telemetry Data", Retrieved at<<http://www.teamqsi.com/doc/spie-iss-2001.pdf>>, pp. 12.

"Understanding Anti-Malware Research and Response at Microsoft", Retrieved at<<http://download.microsoft.com/download/0/c/0/0c040c8f-2109-4760-a750-96443fd14ef2/Understanding%20Malware%20Research%20and%20Response%20at%20Microsoft.pdf>>, pp. 20.

* cited by examiner

IDENTIFICATION OF TELEMETRY DATA

BACKGROUND

Computers often incorporate security measures to protect programs and data from security threats. Examples of security threats include malware, such as viruses and trojans. Anti-virus applications that can scan files and data located at a computer to identify possible threats are commonly installed as a security measure. Anti-virus applications typically compare each file at the computer where they are installed to virus definition files. The vendor of the anti-virus application may periodically update the virus definition files used by the anti-virus application, so that computer users may be protected from the latest security threats.

When an anti-virus application detects a virus at a computer, it typically disrupts a user of the computer with a notification that a virus has been detected. Some anti-virus programs send information regarding the detected virus to the vendor of the anti-virus program. Upon receiving the information regarding the virus, the vendor may occasionally desire additional information regarding the computer where the virus was identified. When the vendor desires additional information, the user of the computer may be interrupted with a notification that the vendor desires the additional information regarding the computer.

SUMMARY

A system is disclosed to automatically identify and submit telemetry data. The system includes a server connected to multiple user computers via a network. Each user computer is capable of receiving data from the server and sending data to the server. The user computers can receive data from the server, such as anti-malware engine updates and updates to telemetry data identification files. An anti-malware engine at each user computer can scan files on the user computer and use telemetry data identification files, such as definition files that include file signatures, to identify files that are candidates for telemetry collection. Alternatively, the anti-malware engine may use a behavior heuristic, such as a file scan time, to identify a telemetry candidate. When a file is identified as a candidate for telemetry collection, the user computer where the file is located sends an offer of a sample of the identified file to the server. By controlling telemetry collection attributes in the telemetry data identification files, the server can control specified types of files that are identified and offered as samples by the user computers. The specified types of files are not limited to malware, and may include any other type of file of interest to the server.

The scanning of files at the user computers, the identification of files at the user computers, and the communication of offers to the server can all occur without burdening users with notifications or a noticeable impact on computer performance. The server may choose to accept or decline each offer of a file sample from a user computer. When the offer is accepted, a user at the user computer that sent the offer may be prompted for permission to send the file. When permission is received from the user, a sample of the file may be sent to the server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a method is disclosed that includes scanning a file by an anti-malware engine and comparing the scanned file to at least one attribute to identify the file as a candidate for telemetry collection. The method also includes identifying the file as a telemetry candidate by identifying a match between the scanned file and the at least one attribute. The method also includes communicating an offer to send a sample of the file to a server and receiving a response to the offer from the server. A sample of the file is sent to the server when the response indicates an acceptance of the offer.

In another particular embodiment, a computer-readable medium is disclosed. The computer-readable medium includes instructions, that when executed by a computer, cause the computer to scan a file on the computer using an anti-malware engine. The anti-malware engine has access to definition files that are updatable independently of the anti-malware engine. The computer-readable medium also includes instructions, that when executed by the computer, cause the computer to determine that the scanned file is a telemetry candidate based on an attribute within the definition files. The computer-readable medium also includes instructions, that when executed by the computer, cause the computer to send an offer to send a sample of the scanned file to a server without user notification, where the offer includes a telemetry report related to the file. The computer-readable medium also includes instructions, that when executed by the computer, cause the computer to receive a response to the offer from the server and send a sample of the file to the server when the response indicates an acceptance of the offer.

In another particular embodiment, a method is disclosed that includes sending telemetry data identification files to a plurality of user computers. The telemetry data identification files include at least one attribute to be used for telemetry collection by an anti-malware engine at each of the user computers. The method includes receiving an offer of telemetry data from a particular user computer. The offer of telemetry data is related to a file on the particular user computer that is identified by the anti-malware engine based on a match between the file and the at least one attribute. The method also includes determining that a sample of the file has not previously been obtained from the particular user computer. The method also includes indicating an acceptance of the offer of telemetry data and receiving telemetry data that includes a sample of the file from the particular user computer.

Figure 1:
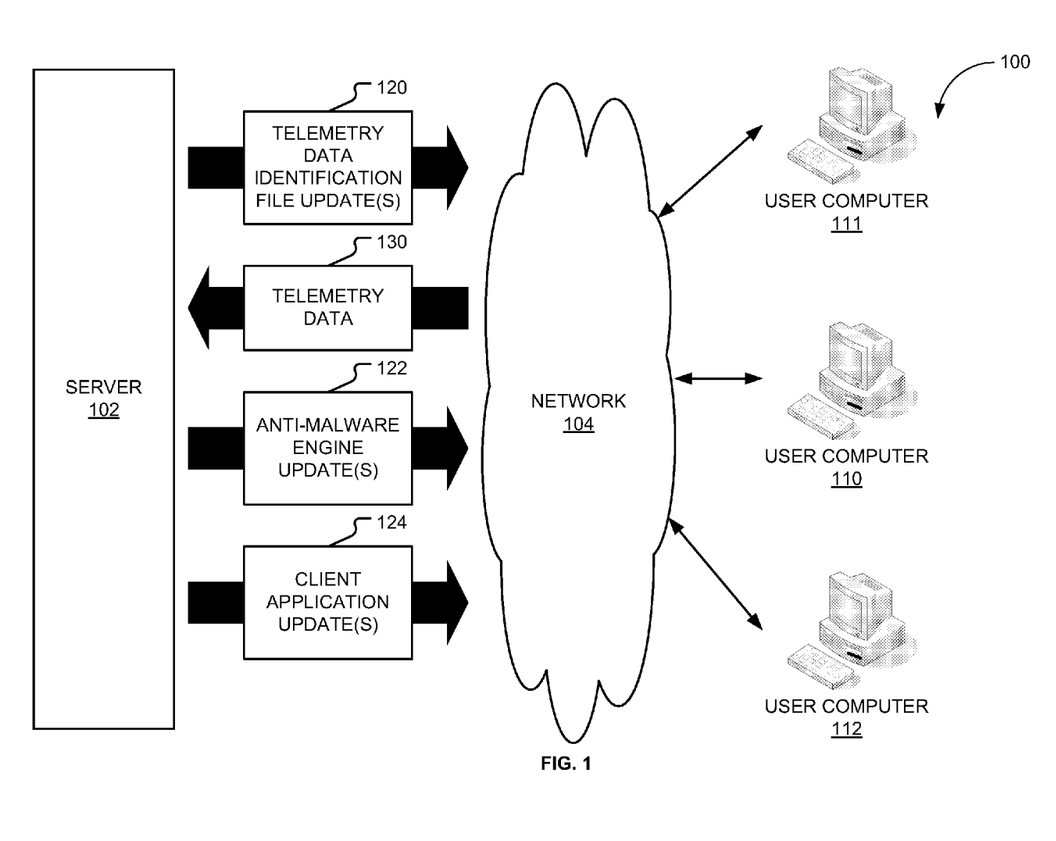
FIG. 1 is a block diagram of a particular embodiment of a system of automatically identifying and submitting telemetry data.

FIG. 1 is a block diagram of a particular embodiment of a system 100 of automatically identifying and submitting telemetry data. The system 100 includes a server 102 communicatively coupled to a plurality of user computers, such as user computers 110, 111, and 112, via a network 104. Generally, the system 100 of FIG. 1 provides for the automatic identification of telemetry data by the user computers 110, 111, and 112.

Each of the user computers 110, 111, and 112 may send data to the server 102. For example, the user computers 110, 111, and 112 may send telemetry data 130 to the server 102 via the network 104. Each of the user computers 110, 111, and 112 may also receive data from the server 102. For example, the user computers 110, 111, and 112 may receive one or more telemetry data identification file updates 120 and one or more anti-malware engine updates 122. By way of example, and not limitation, the network 104 may be a local area network (LAN), wide area network (WAN) or the Internet.

In operation, the server 102 may periodically send the telemetry data identification file updates 120, the anti-malware engine updates 122, and the client application updates 124 to the user computers 110, 111, and 112. The telemetry data identification file updates 120, the anti-malware engine updates 122, and the client application updates 124 may be sent by the server 102 at any time. The telemetry data identification file updates 120, anti-malware engine updates 122, and client application updates 124 may also be sent by the server 102 independently of each other. The user computers 110, 111, and 112 may use the telemetry data identification file updates 120 to identify the telemetry data 130 that is to be sent to the server 102.

It will be appreciated that the system of FIG. 1 allows the server 102 to control specified types of files that are identified as the telemetry data 130 by controlling what is in the telemetry data identification file updates 120. It will also be appreciated that the system of FIG. 1 allows for rapid response to new security threats, because the telemetry data identification files at the user computers 110, 111, and 112 may be updated without having to also send anti-malware engine updates 122 and client application updates 124. For example, the server 102 may send the telemetry data identification file updates 120 multiple times a day, while sending the anti-malware engine updates 122 on a less frequent basis (e.g., monthly). The client application updates 124 may be sent via a separate channel on a less frequent basis (e.g. yearly). Furthermore, the telemetry data identification file update 120 does not have to include a new copy of the telemetry data identification files. In a particular embodiment, the telemetry data identification file update 120 may only include changes since the previous telemetry data identification file update, resulting in a smaller telemetry data identification file update 120.

Figure 2:
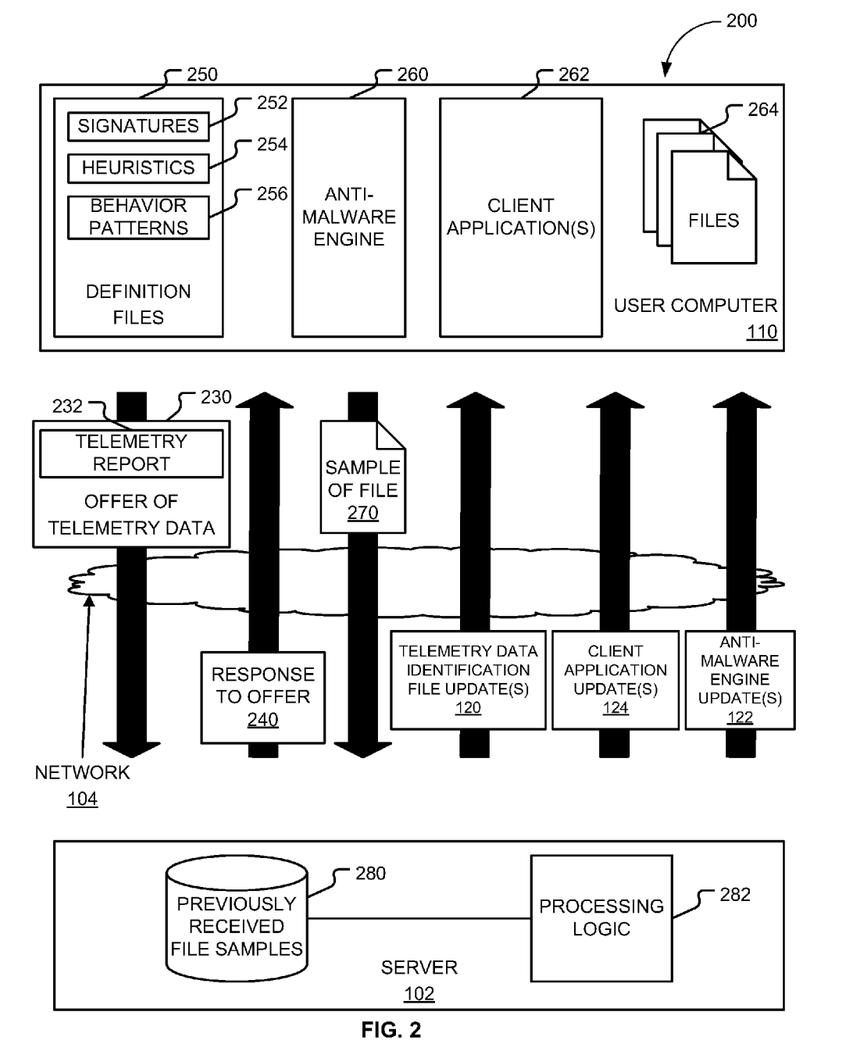
FIG. 2 is a block diagram of another particular embodiment of a system of automatically identifying and submitting telemetry data.

FIG. 2 is a block diagram of another particular embodiment of a system 200 of automatically identifying and submitting telemetry data. In a particular embodiment, the system of FIG. 2 may include many of the same or similar features as discussed with reference to FIG. 1. Accordingly, to simplify the discussion of FIG. 2, features that may be the same or similar between the system illustrated in FIG. 1 and the system illustrated in FIG. 2 have been given the same reference numeral.

The system 200 of FIG. 2 includes a user computer 110 communicatively coupled to a server 102 via a network 104. The user computer 110 may include an anti-malware engine 260, one or more client applications 262, and one or more files 264. In a particular embodiment, the user computer 110 may also include telemetry data identification files that include definition files 250. In another particular embodiment, the anti-malware engine 260 may reside within one of the client applications 262. The user computer 110 may receive the telemetry data identification file updates 120, the client application updates 124, and the anti-malware engine updates 122 from the server 102 via the network 104. As discussed with reference to FIG. 1, the updates may be received independent of each other, e.g. at different times. The user computer 110 may send telemetry data to the server 102 via the network 104. The server 102 includes data storage for previously received file samples 280 as well as processing logic 282.

The anti-malware engine 260 at the user computer 110 may scan the files 264 at the user computer 110 at any time. For example, the files 264 may be scanned by the anti-malware engine 260 prior to being downloaded by a web browser at the user computer 110, during a low-usage time of the user computer 110 (e.g. between the hours of 2 a.m. and 4 a.m., when the user computer 110 is likely not in use), prior to being opened at the user computer 110, prior to being stored at the user computer 110, or after a user-initiated scan of the file by a user of the user computer 110.

The definition files 250 at the user computer 110 may include one or more attributes to be used for telemetry collection by the anti-malware engine 260. By way of example, and not limitation, attributes to be used for telemetry collection may include signatures 252, heuristics 254, and behavior patterns 256. When the definition files 250 include signatures 252, the anti-malware engine 260 may use the signatures 252 to identify telemetry candidates by identifying a match between one of the scanned files 264 on the user computer 110 and a signature. The signatures 252 may include file signatures and strings known to be contained in malware. In a particular embodiment, the server 102 may maintain a blacklist of files that are known to be dangerous and a whitelist of files that are known to be safe. In a particular embodiment, the signatures 252 may include signatures of files that are listed on a blacklist, and exclude signatures of files that are listed on a whitelist.

When the definition files 250 include heuristics 254, the anti-malware engine 260 may identify telemetry candidates by using the heuristics 254 to analyze the files 264 on the user computer 110. By way of example, and not limitation, the heuristics 254 for file analysis by the anti-malware engine 260 may include a maximum acceptable scanning time. When the heuristics 254 include a maximum acceptable scanning time, the anti-malware engine 260 may identify a particular file of the files 264 as a telemetry candidate when scanning of the file by the anti-malware engine 260 takes longer than the maximum acceptable scanning time.

When the definitions files 250 include behavior patterns 256, the anti-malware engine 260 may identify a telemetry candidate by identifying a match between a detected behavior of one of the files 264 and one of the behavior patterns 256. Behavior patterns may include behavior patterns commonly found in files that are known to be malware or otherwise potentially dangerous to user computers, such as the user computer 110. By way of example, and not limitation, the behavior patterns 256 may include a file attempting to replicate itself, a file attempting to write-protect itself, a file attempting to rename itself, a file attempting to hide itself from an operating system, a file attempting to overwrite protected system files, a file attempting to copy itself into a protected directory, and a file attempting to initiate communication with other computing devices without notifying any users of the computer where file is located.

In operation, the anti-malware engine 260 scans the files 264 at the user computer 110. When the anti-malware engine 260 identifies a particular file of the files 264 as a telemetry candidate, an offer of telemetry data 230 is sent to the server 102 via the network 104. The offer of telemetry data 230 may include a telemetry report 232. The telemetry report 232 for a file identified as a telemetry candidate may include a hash of the file, one or more attributes of the file, metadata of the file, a unique identifier of the file, or any other data related to the file. The offer of telemetry data 230 may be sent to the server 102 without user notification at the user computer 110.

The server 102 may receive the offer of telemetry data 230 from the user computer 110 via the network 104. Processing logic 282 located at the server 102 may determine whether to accept the offer of telemetry data 230 from the user computer 110. Processing logic 282 may, in making the determination, determine whether a sample of the file identified as a telemetry candidate has previously been received by the server 102 and stored in the storage for previously received file samples 280. If a sample of the file has previously been received, the processing logic 282 at the server 102 may reject the offer. If a sample of the file has not previously been received, the processing logic 282 at the server 102 may accept the offer.

The server 102 may send a response to the offer 240 to the user computer 110 via the network 104. The response to the offer 240 may indicate an acceptance of the offer of telemetry data 230 or a rejection of the offer of telemetry data 230. The response to the offer 240 may be received at the user computer 110 without user notification at the user computer 110. When the response to the offer 240 indicates an acceptance of the offer of telemetry data 230, a sample of the file 270 identified as a telemetry candidate may be sent from the user computer 110 to the server 102 via the network 104. In a particular embodiment, a user of the user computer 110 may be prompted for permission to send the sample of the file 270 identified as a telemetry candidate to the server 102. Alternatively, the sample of the file 270 identified as a telemetry candidate may be sent to the server 102 without prompting a user of the user computer 110 for permission.

In a particular embodiment, the anti-malware engine 260 may scan a second file of the files 264 and identify the second file as a telemetry candidate. An offer of telemetry data 230 pertaining to the second file may be sent to the server 102, and the server 102 may send a response to the offer 240 pertaining to the second file indicating a rejection of the offer of telemetry data 230 pertaining to the second file. When the response to the offer 240 pertaining to the second file indicates a rejection, the sample of the second file 270 identified as a telemetry candidate may not be sent to the server 102.

It will be appreciated that the system of FIG. 2 allows the server 102 to decline offers of telemetry data, such as when a sample of similar telemetry data has already been received by the server 102. This allows for reduced network traffic between the server 102 and user computers, such as the user computer 110, through the network 104. It will also be appreciated that the system of FIG. 2 allows for the automatic identification and submission of telemetry candidates without notifying or interrupting a user, such as a user of user computer 110. Reducing the number of user interruptions results in an improved and more productive computer user experience.

Figure 3:
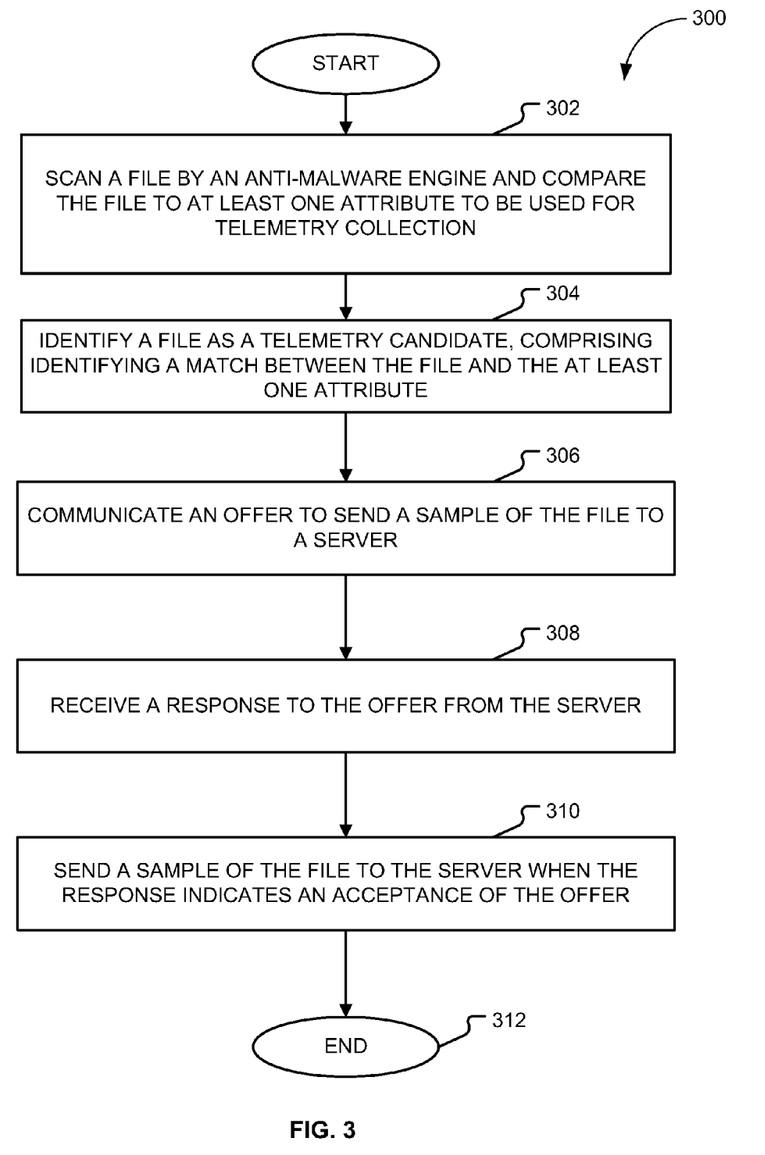
FIG. 3 is a flow diagram of a particular embodiment of a method of automatically identifying and submitting telemetry data.

FIG. 3 is a flow diagram to illustrate a particular embodiment of a method 300 of automatically identifying and submitting telemetry data. In an illustrative embodiment, the method 300 is performed by the user computer 110 of FIG. 1 and FIG. 2. The method includes scanning a file by an anti-malware engine and comparing the file to at least one attribute to be used for telemetry collection, at 302. For example, the anti-malware engine 260 of FIG. 2 may scan one of the files 264 of FIG. 2. In a particular embodiment, the at least one attribute for telemetry collection may include a signature within a definition file. For example, the at least one attribute may include the signatures 252 of FIG. 2 within the definition files 250 of FIG. 2. Alternatively, the at least one attribute for telemetry collection can be matched as defined by the anti-malware engine, such as by use of a behavior heuristic (e.g., scan time). The method includes identifying a file as a telemetry candidate by identifying a match between the file and the at least one attribute, at 304.

The method also includes communicating an offer to send a sample of the file to a server, at 306. For example, the offer of telemetry data 230 of FIG. 2 may be sent to the server 102 of FIG. 2. The method also includes receiving a response to the offer from the server, at 308. For example, the response to the offer 240 of FIG. 2 may be received from the server 102 of FIG. 2. The method also includes sending a sample of the file to the server when the response indicates an acceptance of the offer, at 310. For example, the sample of the file 270 of FIG. 2 may be sent to the server 102 of FIG. 2 when the response to the offer 240 of FIG. 2 indicates an acceptance of the offer of telemetry data 230 of FIG. 2. The method ends at 312.

It will be appreciated that the method of FIG. 3 allows a server to control if it receives file samples, thereby reducing network traffic and avoiding the resubmission of duplicate file samples.

Figure 4:
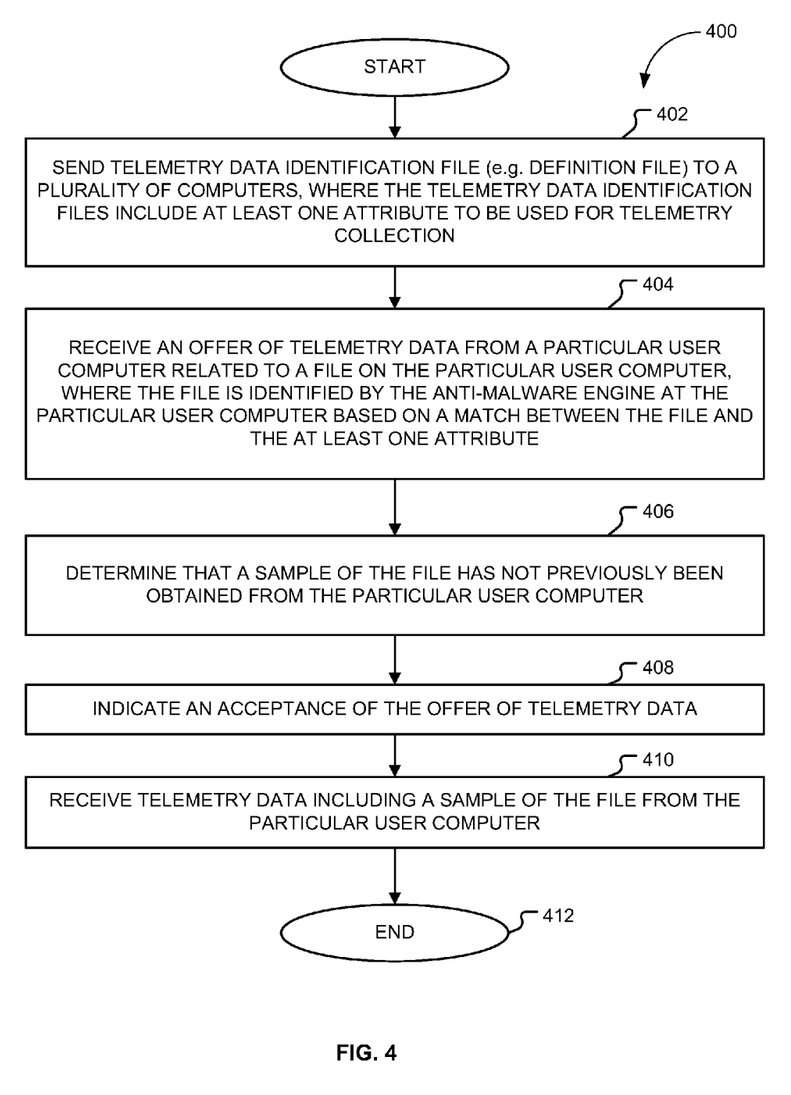
FIG. 4 is a flow diagram of a particular embodiment of a method of processing offers of telemetry data.

FIG. 4 is a flow diagram of a particular embodiment of a method 400 of processing offers of telemetry data. In an illustrative embodiment, the method 400 is performed by the server 102 of FIG. 1 and FIG. 2. The method includes sending telemetry data identification files to a plurality of computers, at 402. The telemetry data identification files include at least one attribute to be used for telemetry collection by an anti-malware engine. For example, telemetry data identification files may be sent to user computers 110, 111, and 112 of FIG. 1. The method also includes receiving an offer of telemetry data from a particular user computer related to a file on the particular computer, at 404. The file is identified by the anti-malware engine at the particular user computer based on a match between the scanned file and the at least one attribute. For example, an offer of telemetry data from the user computer 110 of FIG. 2 may be received. The method also includes determining that a sample of the file has not previously been obtained from the particular user computer, at 406. For example, the server 102 of FIG. 2 may determine that a sample of the file has not previously been obtained from the user computer 110 of FIG. 2 by checking the storage for previously received file samples 280 of FIG. 2. The method also includes indicating an acceptance of the offer of telemetry data, at 408. For example, the server 102 of FIG. 2 may send an acceptance of the offer. The method further includes receiving telemetry data including a sample of the file from the particular user computer, at 410. For example, the server 102 of FIG. 2 may receive the sample of the file 270 of FIG. 2. The method ends at 412.

It will be appreciated that the method of FIG. 4 provides for the efficient submission of telemetry data, because a file sample is submitted when its corresponding offer of telemetry data is accepted. As such, in situations when a sample of the file is not desired, such as when a sample of a similar file has already been received, network traffic is not congested by unwanted file sample submissions.

Figure 5:
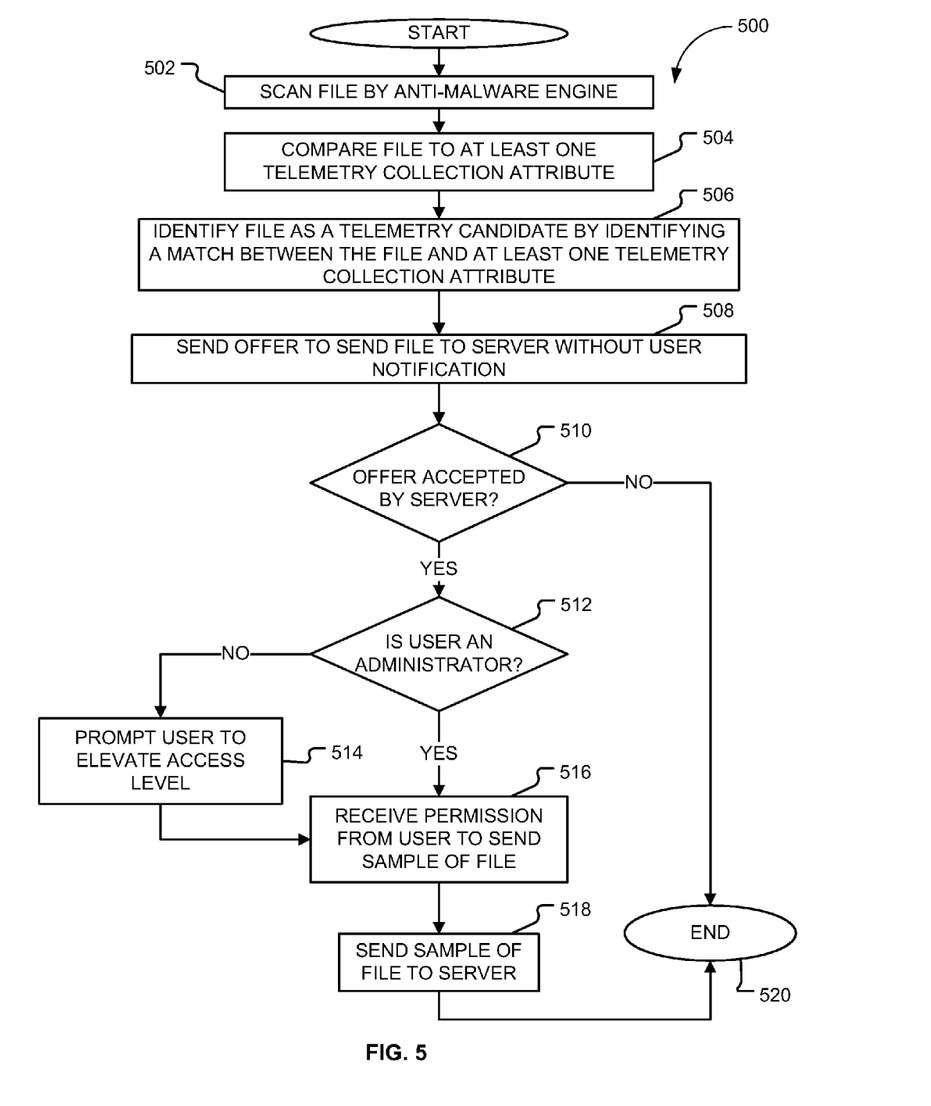
FIG. 5 is a flow diagram of another particular embodiment of a method of automatically identifying and submitting telemetry data.

FIG. 5 is a flow diagram of another particular embodiment of a method 500 of automatically identifying and submitting telemetry data. In an illustrative embodiment, the method is performed by the user computer 110 of FIG. 1 and FIG. 2. The method includes scanning a file by an anti-malware engine, at 502. For example, the anti-malware engine 260 of FIG. 2 may scan one of the files 264 of FIG. 2. The method also includes comparing the scanned file to at least one telemetry collection attribute, at 504. For example, the at least one telemetry collection attribute may include the signatures 252, heuristics 254, behavior patterns 256, or combinations thereof, of FIG. 2. The method may also include identifying a file as a telemetry candidate by identifying a match between the scanned file and at least one telemetry collection attribute, at 506. For example, a match may be identified between the scanned file and one of the signatures 252 of FIG. 2. The method also includes communicating an offer to send the file to a server, at 508. The offer may be sent to the server without user notification. For example, the offer of telemetry data 230 of FIG. 2 may be sent to the server 102 of FIG. 2 without user notification at the user computer 110 of FIG. 2. The method also includes determining whether the server accepts the offer, at 510. If the server rejects the offer, then the method ends, at 520.

In a particular embodiment, the anti-malware engine and the file identified as a telemetry candidate may be located at a user computer having a plurality of users associated therewith, each user of the plurality of users having an associated user access level. One or more of the user access levels may allow access to the file identified as the telemetry candidate, and one or more of the user access levels may not allow access to the file identified as a telemetry candidate. In a particular embodiment, a user access level that allows access to the file may be an administrator access level, and a user access level that does not allow access to the file may be a non-administrator access level. If the server accepts the offer, the method includes determining whether a particular user of the computer has an administrator access level, at 512. For example, if the server 102 of FIG. 2 accepts the offer of telemetry data 230 of FIG. 2, the method includes determining whether a user of the user computer 110 of FIG. 2 is an administrator. If the user is an administrator and has an administrator access level, then permission is received from the user to send a sample of the file to the server, at 516. If the user does not have access to the file, then the user is prompted to elevate his or her user access level to an elevated user access level that allows access to the file, at 514. Such elevation of the user's user access level may be temporary or permanent. If the user successfully elevates his or her access level, then permission is received from the user to send the sample of the file to the server, at 516. The method also includes sending a sample of the file identified as a telemetry candidate to the server, at 518. For example, the sample of the file 270 of FIG. 2 may be sent to the server 102 of FIG. 2. The method ends at 520.

It will be appreciated that the method of FIG. 5 allows for the automatic identification and submission of telemetry data in compliance with a computer's privacy rules. When a user of the computer does not have access to the file, such as when the user is utilizing a guest account or when the file is a protected system file, the user is requested to elevate his or her access level to a level that allows access to the file. As such, users may not submit samples of files that they do not have access to.

Figure 6:
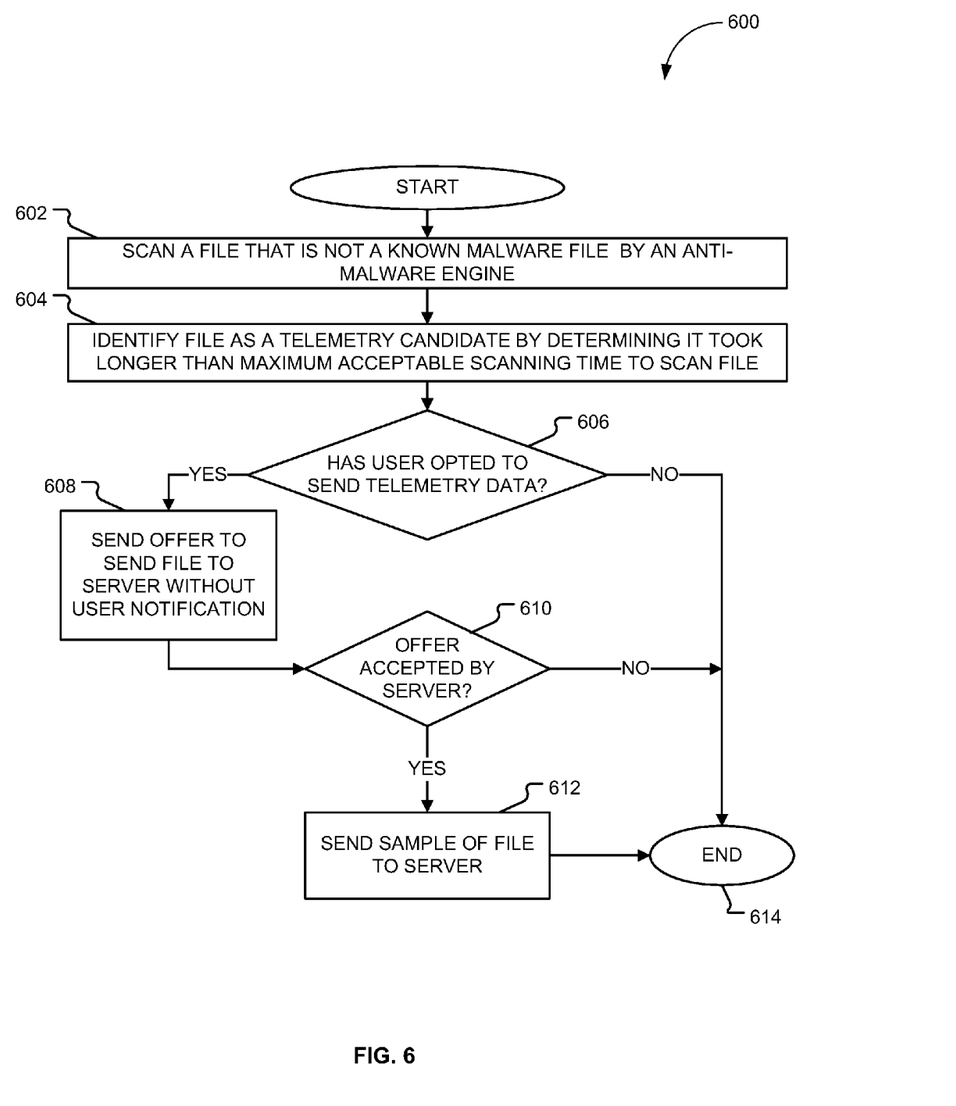
FIG. 6 is a flow diagram of another particular embodiment of a method of automatically identifying and submitting telemetry data.

FIG. 6 is a flow diagram of another particular embodiment of a method 600 of automatically identifying and submitting telemetry data. In an illustrative embodiment, the method is performed by the user computer 110 of FIG. 1 and FIG. 2. The method includes scanning a file that is not a known malware file by an anti-malware engine, at 602. For example, one of the files 264 of FIG. 2 that is not a known malware file may be scanned by the anti-malware engine 260 of FIG. 2. The method also includes identifying the file as a telemetry candidate by determining that it took longer than a maximum acceptable scanning time to scan the file, at 604. For example, it may be determined that one of the files 264 of FIG. 2 took the anti-malware engine 260 of FIG. 2 longer than the maximum acceptable scanning time to scan. A maximum acceptable scanning time is one example of a heuristic for file analysis by the anti-malware engine, such as the heuristics 254 of FIG. 2. The method also includes determining whether a user of the computer where the anti-malware engine resides has opted to send telemetry data, at 606. For example, it may be determined whether a user of the user computer 110 of FIG. 2 has opted to send telemetry data. If the user has not opted to send telemetry data, the method ends, at 614. If the user has opted to send telemetry data, then an offer to send the file to the server is sent, at 608. The offer may be sent without user notification. For example, the offer of telemetry data 230 of FIG. 2 may be sent to the server 102 of FIG. 2 without user notification at the user computer 110 of FIG. 2. The method also includes determining whether the server accepts the offer, at 610. If the server rejects the offer, the method ends, at 614. However, if the server accepts the offer, the method includes sending a sample of the file identified as the telemetry candidate to the server, at 612. For example, the sample of the file 270 of FIG. 2 may be sent to the server 102 of FIG. 2 if the server 102 of FIG. 2 accepts the offer of telemetry data 230 of FIG. 2. The method ends at 614.

It will be appreciated from the method of FIG. 6 that the anti-malware engine may be used to identify not only malware, but also identify any other type of file that may be of interest to the server. For example, identifying files that take longer than a maximum acceptable scanning time to scan may be useful in creating a performance upgrade for the anti-malware engine, transmitted in the form of a subsequent anti-malware engine update, such as the anti-malware engine update 122 of FIG. 2. Furthermore, because the same anti-malware engine may identify both telemetry candidates that are malware as well as telemetry candidates that are not malware, this dual functionality may be provided to users without the users noticing any significant performance degradation. In a particular embodiment, the server may receive a sample of a file that is not malware by the anti-malware engine, the server may determine that the file is malware, and the server may use the file sample to create a malware definition that is sent to the plurality of user computers in a subsequent update of the telemetry data identification files. It will also be appreciated from the method of FIG. 6 that users of the plurality of computers coupled to the server may use the computers without interruption while the anti-malware engine residing on each of the computers scans files at each of the computers to identify possible telemetry candidates. Furthermore, when new malware spreads among one or more of the plurality of computers, and many offers of telemetry data regarding the new malware are sent to the server, only one user may be interrupted with a prompt for permission to send a sample of the new malware to the server. All other users, whose computers have made similar offers to the server, receive rejections from the server and therefore may not receive a prompt for permission to send a file sample to the server.

Figure 7:
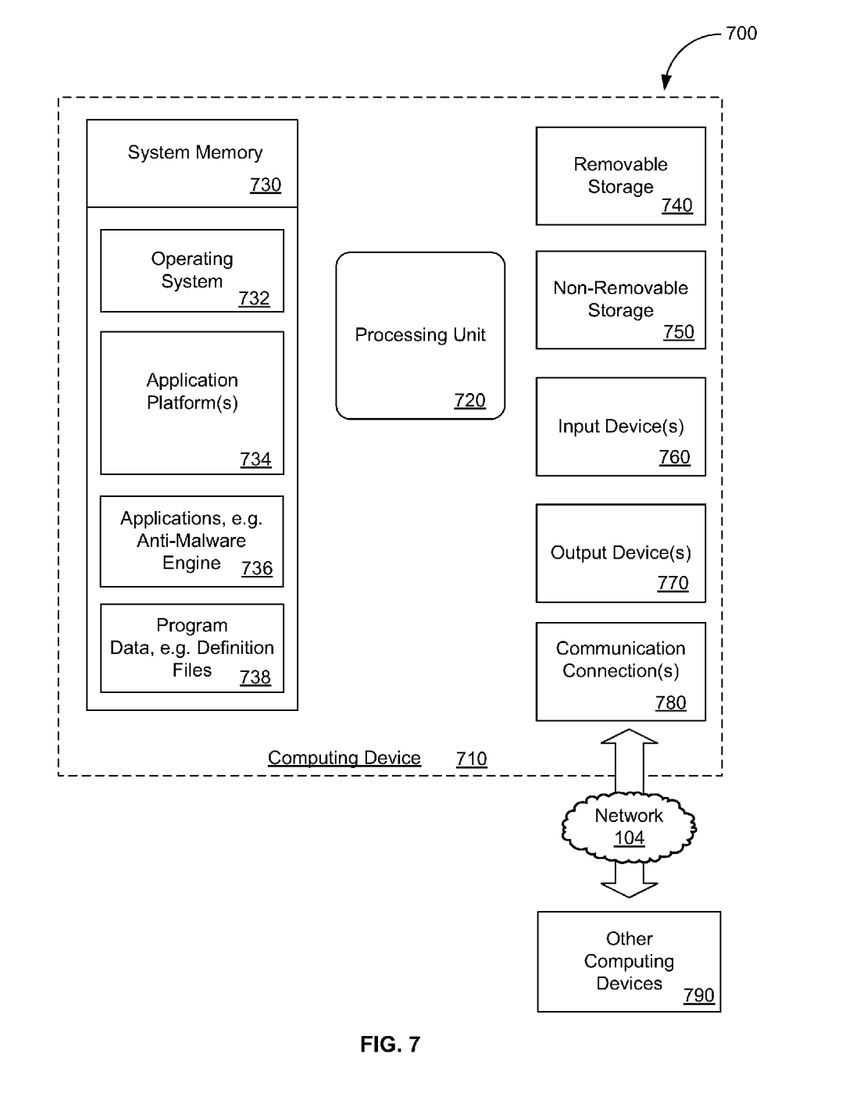
FIG. 7 is a block diagram of a computing environment including a computing device operable to support embodiments of computer-implemented methods, computer program products, and system components as illustrated in FIGS. 1-6.

FIG. 7 shows a block diagram of a computing environment 700 including a computing device 710 operable to support embodiments of computer-implemented methods, computer program products, and system components according to the present disclosure. In a basic configuration, the computing device 710 may include a server configured as described with reference to FIG. 1-6. For example, the computing device 710 may include the server 102 of FIG. 1 or FIG. 2. In another basic configuration, the computing device 710 may include a user computer configured as described with reference to FIG. 1-6. For example, the computer device 710 may include the user computers 111 or 112 of FIG. 1, or the user computer 110 of FIG. 1 or FIG. 2.

The computing device 710 typically includes at least one processing unit 720 and system memory 730. Depending on the exact configuration and type of computing device, the system memory 730 may be volatile (such as random access memory or "RAM"), non-volatile (such as read-only memory or "ROM," flash memory, and similar memory devices that maintain the data they store even when power is not provided to them) or some combination of the two. The system memory 730 typically includes an operating system 732, one or more application platforms 734, one or more applications 736, and may include program data 738. In a particular embodiment, the system memory 730 may include the anti-malware engine 260 of FIG. 2, the client application 262 of FIG. 2, the definition files 250 of FIG. 2, and the files 264 of FIG. 2.

The computing device 710 may also have additional features or functionality. For example, the computing device 710 may also include removable and/or non-removable additional data storage devices such as magnetic disks, optical disks, tape, and standard-sized or miniature flash memory cards. Such additional storage is illustrated in FIG. 7 by removable storage 740 and non-removable storage 750. Computer storage media may include volatile and/or non-volatile storage and removable and/or non-removable media implemented in any method or technology for storage of information such as computer-readable instructions, data structures, program components or other data. The system memory 730, the removable storage 740 and the non-removable storage 750 are all examples of computer storage media. The computer storage media includes, but is not limited to, RAM, ROM, electrically erasable programmable read-only memory (EE-PROM), flash memory or other memory technology, compact disks (CD), digital versatile disks (DVD) or other optical storage, magnetic cassettes, magnetic tape, magnetic disk storage or other magnetic storage devices, or any other medium which can be used to store the desired information and which can be accessed by computing device 710. Any such computer storage media may be part of the device 710. The computing device 710 may also have input device(s) 760 such as a keyboard, mouse, pen, voice input device, touch input device, etc. Output device(s) 770 such as a display, speakers, printer, etc. may also be included.

The computing device 710 also contains one or more communication connections 780 that allow the computing device 710 to communicate with other computing devices 790, such as one or more client computing systems or other servers, over a wired or a wireless network. In a particular embodiment, the computer device 710 may communicate with the server 102 of FIG. 2 via the network 104. In another particular embodiment, the computing device 710 may communicate with the user computer 110 of FIG. 2. The one or more communication connections 780 are an example of communication media. By way of example, and not limitation, communication media may include wired media such as a wired network or direct-wired connection, and wireless media such as acoustic, RF, infrared and other wireless media. It will be appreciated, however, that not all of the components or devices illustrated in FIG. 7 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   scanning a file by an anti-malware engine, the anti-malware engine receiving telemetry data from a server, the telemetry data including at least one attribute, and comparing the file to the at least one attribute;
   identifying the file as a telemetry candidate, the telemetry candidate identified by a malware detection engine at a client device, the malware detection engine configured to detect known malware and other potentially dangerous software, wherein the file is identified as the telemetry candidate in response to identifying a match between the file and the at least one attribute;
   communicating an offer to send a sample of the file to the server;
   receiving a response to the offer from the server; and
   after receiving the response:
      sending the sample of the file to the server conditioned on the response indicating an acceptance of the offer to send the sample; and
      refraining from sending the sample of the file to the server conditioned on the response indicating a refusal of the offer to send the sample.

2. The method of claim 1, wherein the at least one attribute comprises a heuristic for file analysis by the anti-malware engine or a signature within a definition file.

3. The method of claim 2, wherein the heuristic comprises a maximum acceptable scanning time, and wherein identifying a match comprises determining that scanning the file took longer than the maximum acceptable scanning time.

4. The method of claim 1, wherein the at least one attribute further comprises a behavior pattern.

5. The method of claim 2, wherein the definition file is included in telemetry data identification files that are independently updatable from the anti-malware engine.

6. The method of claim 1, wherein the offer to send the file further comprises a telemetry report related to the file, wherein the telemetry report includes at least one of a hash of the file, attributes of the file, and metadata of the file.

7. The method of claim 1, wherein the file is identified as a telemetry candidate at a computer having a plurality of users, wherein each of the plurality of users has an associated user access level.

8. The method of claim 7, further comprising:
   determining that a user access level associated with a particular user of the computer allows access to the file;
   prompting the particular user for permission to send the file to the server; and
   receiving permission from the particular user to send the file to the server.

9. The method of claim 8, wherein the user access level that allows access to the file is an administrator access level.

10. The method of claim 7, further comprising:
    determining that a user access level associated with a particular user does not allow access to the file;
    prompting the particular user to elevate the user access level to an elevated user access level that allows access to the file;
    determining that the particular user has elevated the user access level to the elevated user access level;
    prompting the particular user for permission to send the file to the server; and
    receiving permission from the particular user to send the file to the server.

11. The method of claim 10, wherein the user access level that does not allow access to the file is a non-administrator access level.

12. The method of claim 10, wherein the elevated user access level that allows access to the file is an administrator access level.

13. The method of claim 1, wherein sending the offer to the server and receiving the response to the offer from the server occur without user notification.

14. The method of claim 1, wherein the file is scanned during one of: prior to downloading the file by a web browser, a low-usage time, and prior to opening the file.

15. A computer-readable storage device comprising instructions, that when executed by a computer, cause the computer to:
    scan a file on the computer, wherein the file is not a known malware file, wherein the file is scanned by an anti-malware engine on the computer, and wherein the anti-malware engine has access to definition files that are received from a server and updateable independently of updating the anti-malware engine;
    determine that the file is a telemetry candidate based on an attribute within the definition files, the telemetry candidate identified by a malware detection engine at a client device, the malware detection engine configured to detect known malware and other potentially dangerous software;
    send an offer to send a sample of the file to the server without user notification, wherein the offer comprises a telemetry report related to the file;
    receive a response to the offer from the server;
    send the sample of the file to the server conditioned on the response indicating an acceptance of the offer to send the sample; and
    refrain from sending the sample of the file to the server conditioned on the response indicating a refusal of the offer to send the sample.

16. The computer-readable storage device of claim 15, further comprising instructions, that when executed by a computer, cause the computer to:
    scan a second file on the computer by the anti-malware engine;
    determine that the second file is a telemetry candidate;
    send a second offer to send a second sample of the second file to the server; and
    receive a second response to the second offer from the server, wherein the second sample of the second file is not sent to the server when the second response indicates a rejection of the offer.

17. A method comprising:
    sending telemetry data identification files to a plurality of user computers, wherein the telemetry data identification files include at least one attribute to be used for telemetry collection by an anti-malware engine;
    receiving an offer of telemetry data from a particular user computer of the plurality of user computers related to a file on the particular user computer, wherein the file is identified by the anti-malware engine as a telemetry candidate at the particular user computer based on a match between the file and the at least one attribute, the telemetry candidate identified by a malware detection engine at the particular user computer, the malware detection engine configured to detect known malware and other potentially dangerous software;

in response to determining that a sample of the file has not previously been obtained:

sending an acceptance of the offer of telemetry data to the particular user computer; and receiving telemetry data comprising a sample of the file from the particular user computer; and in response to determining that a sample of the file has previously been obtained, sending a rejection of the offer of telemetry data to the particular user computer.

18. The method of claim 17, wherein the telemetry data identification files comprise definition files.

19. The method of claim 17, wherein the telemetry data identification files and the anti-malware engine are updateable independently of each other.

20. The method of claim 17, wherein the file is not malware.

* * * * *